W. Young,
Pipe Coupling,

No. 66,932. Patented July 16, 1867.

Witnesses:
Theo Tusche.
J. A. Service.

Inventor:
Wm Young.
Per Munn & Co
Attorneys

United States Patent Office.

WILLIAM YOUNG, OF EASTON, PENNSYLVANIA.

Letters Patent No. 66,932, dated July 16, 1867.

---

IMPROVEMENT IN STEAM AND WATER-JOINTS.

---

The Schedule referred to in these Letters Patent and making part of the same.

---

TO ALL WHOM IT MAY CONCERN:

Be it known that I, WILLIAM YOUNG, of Easton, Northampton county, Pennsylvania, have invented a new and improved Steam and Water-Joint; and I do hereby declare that the following is a full, clear, and exact description thereof, which will enable others skilled in the art to make and use the same, reference being had to the accompanying drawings, forming part of this specification.

This invention relates to the manner in which steam and water pipes are joined together so as to make a tight joint, and it consists in providing for packing between the fitting and lock-nut, as I will proceed to describe.

Similar letters of reference indicate corresponding parts.

Figure 1:
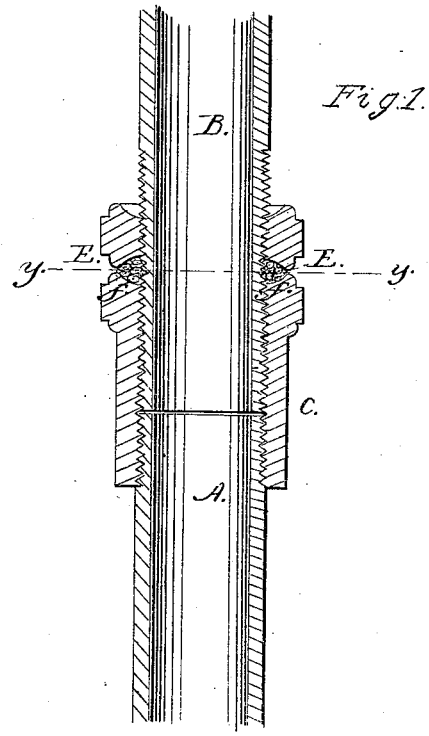
Figure 1 is a longitudinal vertical section of two pieces of pipe joined together according to my plans, the section being through the line $x\,x$ of fig. 2.
Figure 2:
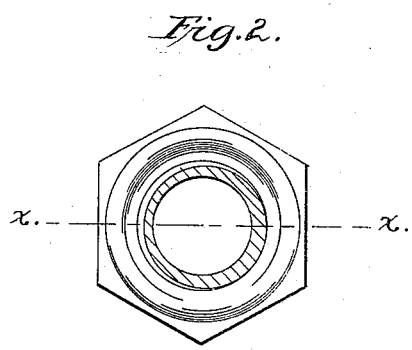
Figure 2 is a cross-section through the line $y\,y$ of fig. 1.

A and B represent the two pieces of pipe which are joined together. C is the fitting or socket. D is the lock-nut. Where the fitting or socket C is connected with the pipe A, the connection is permanent, and is easily made tight. The difficulty is with the piece which is screwed into the other end of the socket, where the connection is not permanent, and where the screw-threads do not fit together so tightly. Under high pressure of either water or steam, this joint is apt to leak, as the old or common manner of fitting allowed little or no chance for packing. It will be noticed that the end of the socket C, as well as the end of the lock-nut D, is concave, which leaves a recess, E, between the two for packing. As represented in the drawing, this recess is filled with packing, which is marked $f$. It will be seen that by screwing down the nut D, the packing (which may be any suitable elastic or soft metallic substance) will be compressed tightly around the thread of the pipe, thus preventing the escape of either water or steam under any required pressure. This manner of securing the joint is adapted to all pipes containing liquids, gas, or vapor under pressure.

What I claim, and desire to secure by Letters Patent, is—

1. The cavity or recess E, between the fitting and the nut D, substantially as and for the purpose set forth in combination with the pipe A B.

2. I claim the nut D, in combination with the socket or fitting C, and the recess E, substantially as shown and described for the purposes specified.

The above specification of my invention signed by me this 5th day of April, 1867.

WILLIAM YOUNG.

Witnesses:
BEATES R. SWIFT,
N. HOYT, Jr.